United States Patent [19]
Kollanyi

[11] Patent Number: 4,893,002
[45] Date of Patent: Jan. 9, 1990

[54] LOSS OF OPTICAL INPUT CIRCUIT

[75] Inventor: Miklos J. Kollanyi, Albuquerque, N. Mex.

[73] Assignee: AG Communications Systems Corporation, Phoenix, Ariz.

[21] Appl. No.: 248,310

[22] Filed: Sep. 19, 1988

Related U.S. Application Data

[63] Continuation of Ser. No. 944,042, Dec. 22, 1986, abandoned.

[51] Int. Cl.[4] .............................................. H01J 40/14
[52] U.S. Cl. ......................... 250/214 R; 250/214 AL
[58] Field of Search ............ 250/206, 214 R, 214 AL; 356/226, 227; 315/149; 330/252, 254, 257

[56] References Cited

U.S. PATENT DOCUMENTS

| | | | |
|---|---|---|---|
| 3,961,183 | 6/1976 | Dubot et al. | 250/214 AL |
| 3,990,799 | 11/1976 | Nanba et al. | 356/226 |
| 4,310,755 | 1/1982 | Miller | 250/214 R |
| 4,388,732 | 6/1983 | Hansel | 455/612 |
| 4,435,850 | 3/1984 | Bowen et al. | 455/612 |
| 4,596,049 | 6/1986 | Rizzotti | 455/612 |

*Primary Examiner*—David C. Nelms
*Attorney, Agent, or Firm*—Anthony Miologos

[57] ABSTRACT

A loss of optical input detector is disclosed disposed to receive a signal voltage from a fiber-optic receiver indicating that the optical input has dropped below a preset threshold. The detector includes a voltage follower connected to the fiber-optic receiver which passes to the detector circuit the signal voltage. A comparator circuit receives the signal voltage and compares it to a reference voltage. When the signal voltage is greater than the reference voltage the comparator produces and applies to an alarm circuit a positive voltage signal. This positive voltage signal turns on the alarm circuit. The alarm circuit provides a visual alarm indication and a logic signal to a controller interface indicating a loss of the optical input signal.

3 Claims, 2 Drawing Sheets

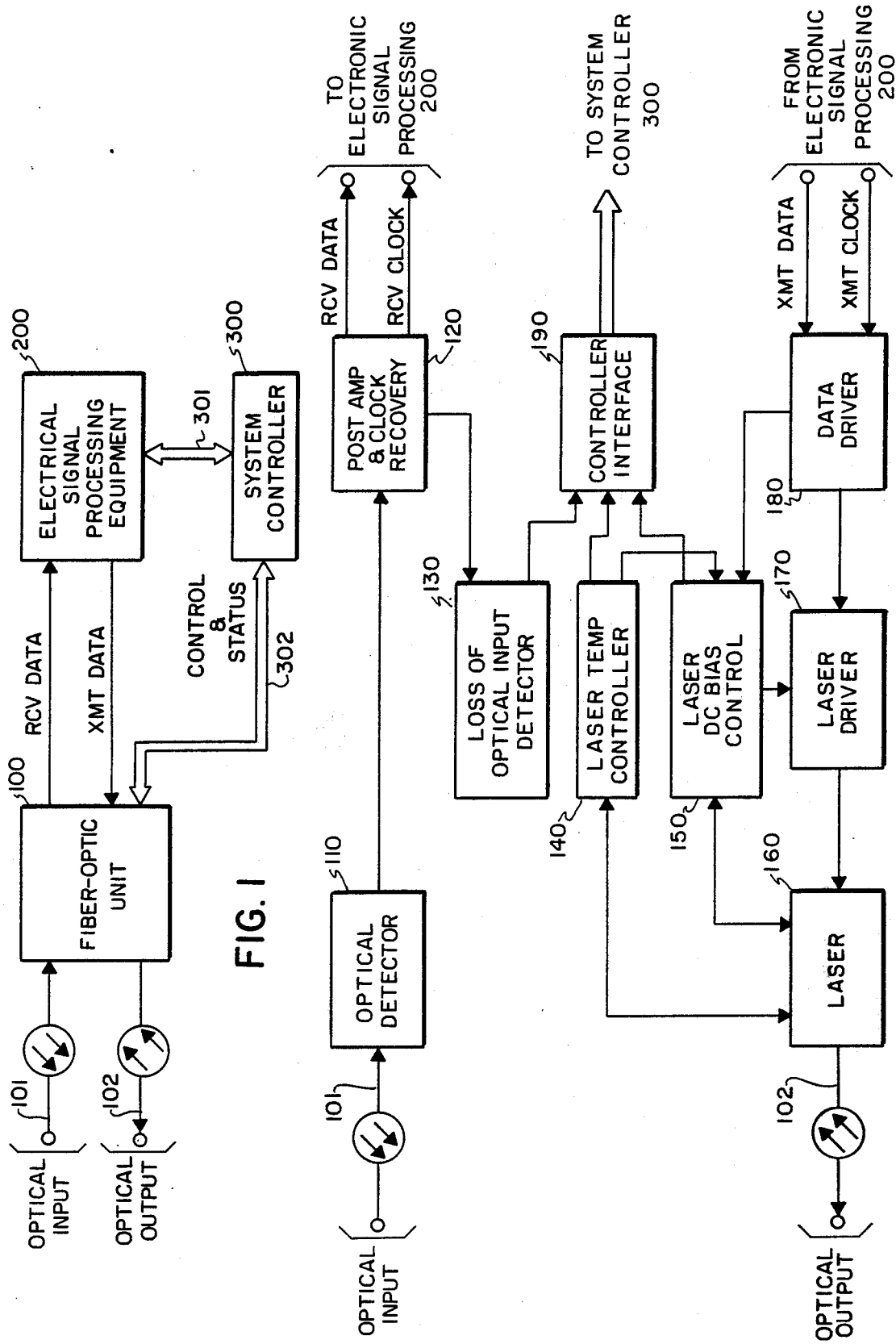

LOSS OF OPTICAL INPUT CIRCUIT

This is a continuation of co-pending application Ser. No. 944,042 filed on 12/22/86, now abandoned.

CROSS-REFERENCE TO RELATED APPLICATIONS

The present application is related to the following co-pending U.S. Patent Applications all having a common assignee:

Ser. No. 944,045, filed on Dec. 22, 1986, titled, "OPTICAL DETECTOR CIRCUIT", now abandoned;

Ser. No. 205,012, filed on May 31, 1988, titled, "LASER DRIVER CIRCUIT", now U.S. Pat. No. 4,809,286;

Ser. No. 944,043, filed on Dec. 22, 1986, titled, "LASER DC BIAS CONTROLLER", U.S. Pat. No. 4,757,193;

Ser. No. 944,044, filed on Dec. 22, 1986, titled, "LASER TEMPERATURE CONTROLLER", now U.S. Pat. No. 4,792,957;

BACKGROUND OF THE INVENTION

This invention relates in general to fiber-optic receiver/transmitter arrangements and more specifically to a novel loss of optical input circuit for a fiber-optic receiver.

Fiber-optic receivers and transmitters or fiber-optic interface units are used in modern telecommunications and data transmission systems between an optical fiber transmission line and electronic digital equipment. The fiber-optic transmitter receives electrical signals from the electronic equipment representing the data to be transmitted. The transmitter then converts the data to light pulses which are coupled to an optical fiber transmission line. The fiber-optic receiver receives light pulses representing the transmitted data from an optical fiber transmission line and converts the light pulses to electrical signals which are sent to and processed by the electronic digital equipment. These systems work in very high transmission rates from 145 Mbs to 2400 Mbs (Megabits per second).

Transmission of data or other signals along optical fiber transmission lines have advantage in the fact that light rays are almost immune to electromagnetic interference such as sparks, lightening, crosstalk and other interference which may be induced into the transmission line.

It is advantageous in fiber-optic receivers of the type discussed above to ascertain if a reliable optical input signal is being received. The fiber-optic receiver then can send warning alarms to a system controller notifying that a problem exists on the transmission line.

It therefore becomes an object of the present invention to disclose a novel loss of optical input signal detector which can detect the loss of the optical input signal and signal a system controller of the problem.

SUMMARY OF THE INVENTION

In accomplishing the object of the present invention there is provided a fiber-optic receiver which includes an optical detector for receiving an optical signal, and a loss of signal generating circuit for developing a signal voltage when the optical input drops below a preset threshold.

The loss of optical input detector of the present invention includes voltage follower means connected to the loss signal generating circuit. The voltage follower passes to the detector circuit the signal voltage from the loss signal generating circuit.

Comparator means comprising first and second switching devices has the first switching device connected to the voltage follower means. The second switching device is connected to a reference voltage source. The second switching device produces a positive voltage signal in response to the application of the signal voltage to the first switching device from the voltage follower means, when the applied voltage signal is greater than the reference voltage.

Alarm signal generating means connected to the second switching device provides a visual alarm indication and an alarm signal to a controller interface indicating the loss of the optical input signal. The alarms are triggered by the applied positive voltage signal from the comparator means second switching device.

A BRIEF DESCRIPTION OF THE DRAWINGS

A better understanding of the invention may be had from the consideration of the following detailed description taken in conjunction with the accompanying drawings in which:

FIG. 1 is a block diagram of illustrating the interconnections of a Fiber-Optic Interface Unit to Electrical Signal Processing Equipment and to a System Controller;

FIG. 2 is block diagram detailing the structure of the Fiber-Optic Unit and including the loss of optical input detector circuit of the present invention;

DESCRIPTION OF THE PREFERRED EMBODIMENT

Figure 3:
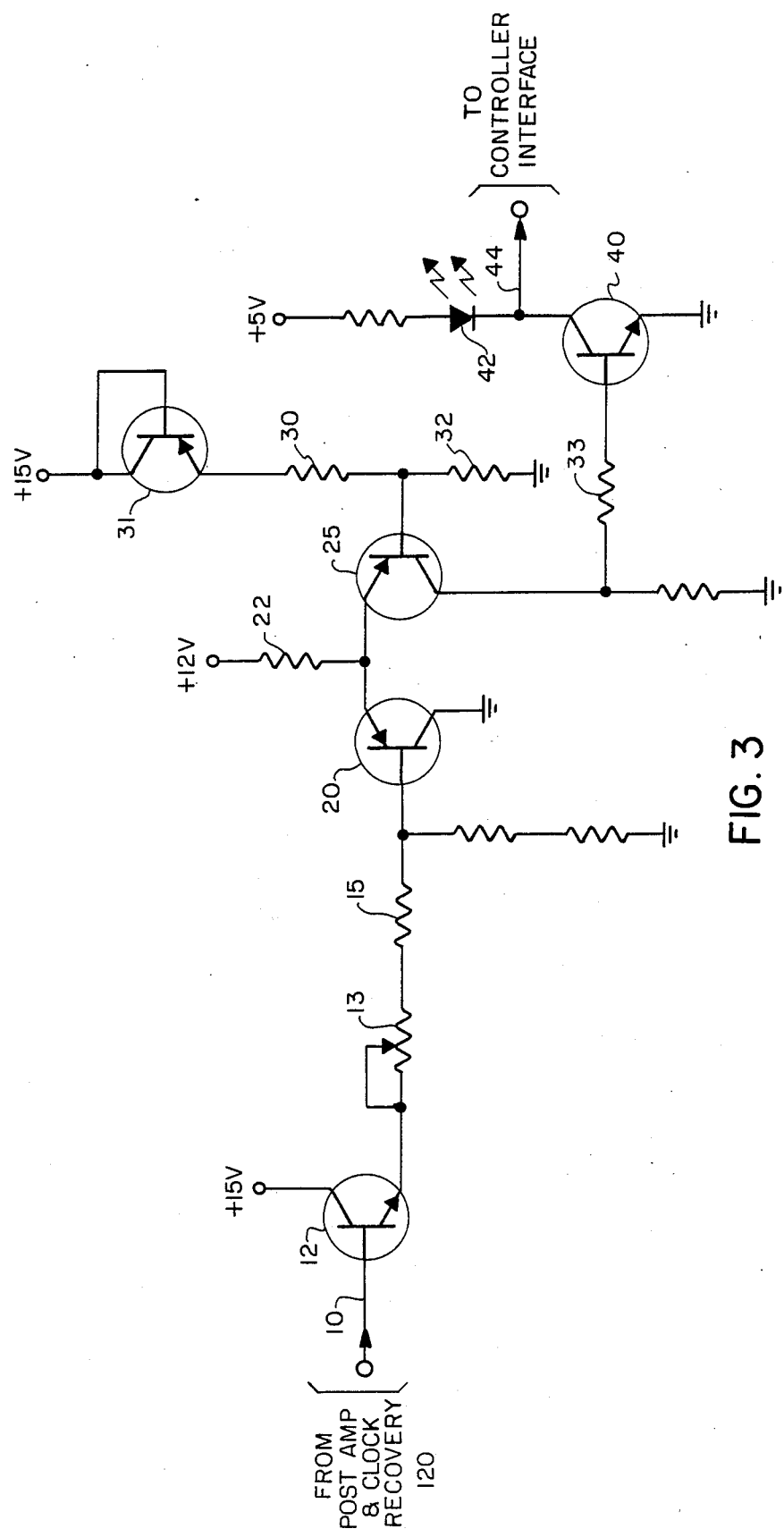
FIG. 3 is detailed schematic of the present invention.

Turning now to FIG. 1 of the included drawings a representation of a system for converting light pulses to electrical signals which uses the optical detector of the present invention is shown. The system shown includes a Fiber Optic Unit (FOU) 100, Electrical Signal Processing Equipment (ESP) 200 and a System Controller (SC) 300.

In the receive path, (data flow away from the optical fiber) a single mode optical fiber light guide is terminated in the FOU 100. The FOU 100 detects the light pulses and converts the received light pulses to electrical pulses. The electrical pulses are amplified and then fed via the RCV DATA line to the ESP 200 equipment where the received data is recovered and used. The ESP 200 equipment can be any digital and/or analog device which can use the recovered data. For example, in telecommunication equipment the ESP equipment can represent a switching system for routing telephone calls from one subscriber to the other. Still in another example the ESP equipment could represent a central computer connected to peripheral terminals via a fiber-optic network.

In the transmit path, (data flow toward the optical fiber) electrical signals in the form of digital pulses are fed to the FOU 100 from the ESP 200 via XMT DATA line. The digital pulses are then passed to a laser driver circuit in the FOU 100 which intensity modulates a solid state laser. The optical energy from the laser is coupled into a single mode optical fiber 102 and transmitted as light pulses down the optical fiber to receiving equipment (not shown). A system controller SC 300 receives and sends control and status information from/to the FOU 100. For example, the controller can monitor the FOU to determine if an optical signal is being received in order to signal the ESP 200 that data from the FOU is available, or the SC 300 can receive status information concerning the temperature of the transmitting laser or if it has failed.

Turning now to FIG. 2 a description and explanation of the operation of the FOU 100 of the above described system will now be given. In the receive path, the Optical Fiber input 101 is input to an Optical Detector 110. The optical Detector converts the optical energy into electrical signals and then amplifies the received signals.

The amplified electrical signals are passed to a Post Amp & Clock Recovery Circuit 120 where they are further amplified and a clock signal is extracted from the input electrical signal. The extracted clock is re-clocked and the data and clock are passed on to the ESP 200 via the RCV. DATA line and RCV. CLOCK line respectively.

A Loss of Optical Input Detector 130 is connected to the Post Amp & Clock Recovery Circuit. The Loss of Optical input Detector 130 is arranged to send an alarm signal to a Controller Interface 190 whenever the optical input level drops below a preset threshold. The Controller Interface 190 then outputs the alarm to the SC 300.

In the transmit path, electrical signals in the form of digital pulses and a clock signal are input to the Data Driver 180 from the ESP 200 on lines XMT. DATA and XMT. CLOCK respectively. The Data Driver reclocks the data transmitted from ESP 200 using the XMT. CLOCK signal. The output of the Data Driver 180 is sent to the Laser Driver circuit 170 which in turn modulates Laser 160 converting the input electrical signals to an optical signal. The Laser's light output is coupled into a single mode fiber and transmitted out on Optical Output 102.

The Transmit path further includes a Laser DC Bias Control arranged to turn off the Laser 160 in case the data drive fails. This prevents the Laser from being continuously turned on.

A Laser Temperature Controller 140 is also included and used to control the lasers temperature and also the optical output level. Both the Laser temperature controller 140 and Laser DC Bias Control 150 send alarm signals to the Controller Interface 190 in the event that the laser has failed, its temperature is out of limits, or the Data Drive circuit has failed.

Turning now to FIG. 3 a description of the loss of optical input detector 130 of the present invention will be explained in detail. When the optical input level detected by optical detector 110 falls below a preset threshold indicating either a loss of input or an unreliable input signal an AGC control voltage generated within post amp & recovery circuit 120 goes high. This loss signal is input to the loss of optical input detector via lead 10 to the base of transistor 12.

Transistor 12 is configured as a voltage follower, which applies the loss signal via variable resistor 13 and fixed resistor 15 to the base of transistor 20. Resistor 13 adjusts the level of signal applied to transistor 20.

The differential pair shown as transistors 20 and 25 act as a voltage comparator. Transistor 25 receives a biasing voltage from the voltage divider network comprising transistor 31 and resistors 30 and 32. The voltage applied to transistor 25 sets up a reference voltage which keeps the alarm network off.

When the input voltage to the differential pair exceeds the reference voltage, that is, when the loss signal is applied to the base of transistor 20, the voltage at the collector of transistor 25 goes high. The high voltage at the collector of transistor 25 is coupled via resistor 33 to the base of transistor 40. This subsequently turns on transistor 40, causing light emitting diode (LED) 42 to turn on and a negative logic signal to be output via lead 44. The logic signal alarm is sent to the controller interface 190 which signals the system controller that a loss of optical input has occurred.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A loss of optical signal detector used with a signal generating circuit to detect the loss of an optical input signal, said signal generating circuit arranged to develop a signal voltage when said optical input drops below a preset threshold, said loss of optical signal detector comprising:

signal coupling means including a first transistor having its base lead connected to said signal voltage from said signal generating circuit and its collector connected to a source of voltage and current and responsive to the application of said signal voltage from said signal generating circuit said first transistor turns on connecting said source of voltage and current to said first transistor emitter lead;

signal voltage means including first and second resistors connected to said first transistor emitter lead, said signal voltage means arranged to receive said voltage and current from said signal coupling means and produce an output signal representing the loss of the optical signal;

comparator means having a second transistor connected to said signal voltage means and a third transistor connected to said second transistor and to a reference voltage, said third transistor producing an alarm voltage in response to the application of said output signal from said signal voltage means to said second transistor when said signal voltage means output signal is greater than said reference voltage; and, alarm signal generating means connected to said comparator means third transistor, said alarm signal generating means receiving said alarm voltage and producing and sending an alarm signal to a controller interface indicating the loss of said optical input signal.

2. The loss of optical signal detector as claimed in claim 1, wherein: said signal voltage means first resistor is a variable resistor arranged to adjust the magnitude of said output signal produced by said signal voltage means and applied to said comparator means second transistor.

3. The loss of optical signal detector as claimed in claim 1, wherein: said alarm signal generating means further includes a visual alarm signal and a fourth transistor, and said fourth transistor turns on after receiving said alarm voltage from said third transistor activating said visual alarm and producing and sending to said controller interface said alarm signal.

* * * * *